United States Patent
Yabe et al.

(10) Patent No.: US 9,853,520 B2
(45) Date of Patent: Dec. 26, 2017

(54) MOLDED MOTOR AND AIR-CONDITIONING OUTDOOR UNIT

(71) Applicants: Koji Yabe, Tokyo (JP); Naohiro Oketani, Tokyo (JP); Hiroshi Yamanaka, Tokyo (JP); Hironori Yabuuchi, Tokyo (JP)

(72) Inventors: Koji Yabe, Tokyo (JP); Naohiro Oketani, Tokyo (JP); Hiroshi Yamanaka, Tokyo (JP); Hironori Yabuuchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 277 days.

(21) Appl. No.: 14/772,123

(22) PCT Filed: Mar. 28, 2013

(86) PCT No.: PCT/JP2013/059396
§ 371 (c)(1),
(2) Date: Sep. 2, 2015

(87) PCT Pub. No.: WO2014/155631
PCT Pub. Date: Oct. 2, 2014

(65) Prior Publication Data
US 2016/0013699 A1    Jan. 14, 2016

(51) Int. Cl.
*H02K 5/08* (2006.01)
*H02K 5/16* (2006.01)
(Continued)

(52) U.S. Cl.
CPC ........... *H02K 5/161* (2013.01); *F16C 35/042* (2013.01); *H02K 5/08* (2013.01); *H02K 5/15* (2013.01);
(Continued)

(58) Field of Classification Search
CPC  H02K 5/08; H02K 5/15; H02K 5/161; H02K 5/163
See application file for complete search history.

(56) References Cited

U.S. PATENT DOCUMENTS

| 7,928,615 B2 | 4/2011 | Miyashita et al. |
| 8,975,796 B2 | 3/2015 | Kado et al. |

(Continued)

FOREIGN PATENT DOCUMENTS

| DE | 198 18 059 A1 | 10/1999 |
| EP | 2 169 812 A2 | 3/2010 |

(Continued)

OTHER PUBLICATIONS

Office Action dated Jan. 20, 2017 issued in corresponding CN patent application No. 201380074639.8 (and English translation).
(Continued)

*Primary Examiner* — Ramon M Barrera
(74) *Attorney, Agent, or Firm* — Posz Law Group, PLC

(57) ABSTRACT

A molded motor 100 includes a molded stator formed by providing a molding resin to a stator, a rotor inside the molded stator, a pair of bearings supporting a rotor shaft of the rotor, and an insulating bracket fitted in an inner circumferential part of an opening formed at an axial end of the molded stator to surround and support an outer ring of the bearing with a concave part formed at a center, and formed of an insulating resin.

13 Claims, 5 Drawing Sheets

(51) Int. Cl.
    *H02K 5/15*     (2006.01)
    *H02K 5/24*     (2006.01)
    *F16C 35/04*     (2006.01)

(52) U.S. Cl.
    CPC ............... *H02K 5/163* (2013.01); *H02K 5/24* (2013.01); *F16C 2380/26* (2013.01)

(56) References Cited

U.S. PATENT DOCUMENTS

| | | |
|---|---|---|
| 2008/0042499 A1 | 2/2008 | Okada |
| 2010/0079014 A1 | 4/2010 | Miyashita et al. |
| 2012/0032536 A1 | 2/2012 | Kado et al. |

FOREIGN PATENT DOCUMENTS

| | | |
|---|---|---|
| EP | 2 378 645 A1 | 10/2011 |
| JP | 09-093898 A | 4/1997 |
| JP | 09-275653 A | 10/1997 |
| JP | 2000-156952 A | 6/2000 |
| JP | 3635948 B | 1/2005 |
| JP | 2012-151980 A | 1/2011 |
| JP | 2012-244809 A | 12/2012 |

OTHER PUBLICATIONS

International Search Report of the International Searching Authority dated May 14, 2013 for the corresponding international application No. PCT/JP2013/059396 (and English translation).
Extended European Search Report dated Oct. 21, 2016 issued in corresponding EP patent application No. 13880547.8.

(LOAD SIDE)

(LOAD-OPPOSING SIDE)

US 9,853,520 B2

MOLDED MOTOR AND AIR-CONDITIONING OUTDOOR UNIT

CROSS REFERENCE TO RELATED APPLICATION

This application is a U.S. national stage application of International Patent Application No. PCT/JP2013/059396 filed on Mar. 28, 2013, the disclosure of which is incorporated herein by reference.

TECHNICAL FIELD

The present invention relates to a molded motor and an air-conditioning outdoor unit.

BACKGROUND

Motors having a structure in which a member supporting an outer ring of a bearing is covered with, for example, a resin to reduce a shaft current flowing through the bearing have been conventionally proposed to prevent bearing faults due to electric corrosion. In a conventional motor, a bearing needs to be fitted firmly into an insulating bracket not to separate from each other. This causes a problem that work efficiency in motor assembling is low.

For example, Patent Literature 1 listed below discloses a conventional motor in which one side of a bearing bracket that contacts with an insulating member has a concave part, and the insulating member has a convex part corresponding to the concave part. The convex part of the insulating member fitted in the concave part of the bearing bracket prevents separation of the relevant bearing and the bearing bracket and improves the assembling efficiency.

PATENT LITERATURE

Patent Literature 1: Japanese Patent No. 3635948

However, the conventional motor disclosed in Patent Literature 1 listed above includes plural sites where positioning of a rotor in a radial direction is performed. Examples of the sites include (1) a site where an inner circumferential part of a resin part covering an outer ring of a bearing contacts with the outer ring of the bearing, (2) a site where a metallic bracket covering the outside of the resin part contacts with the resin part, and (3) a site where an inner circumferential face of a molded stator contacts with an outer circumferential face of the metallic bracket. A larger number of the sites where positioning of the rotor is performed causes a larger axial misalignment between the centers of the stator and the rotor or a larger eccentricity of the rotor because a combination of tolerances in the sites (1) to (3) generates a variation. Consequently, there is a problem that, for example, an unbalanced magnetic attraction force increases vibration and noise.

SUMMARY

The present invention has been achieved in view of the above problems, and an object of the present invention is to provide a molded motor and an air-conditioning outdoor unit which can reduce vibration and noise.

In order to solve the problems and achieve the object, according to an aspect of the present invention, there is provided a molded motor including: a molded stator that is formed by providing a molding resin to a stator; a rotor provided inside the molded stator; a pair of bearings that support a rotor shaft of the rotor; an insulating bracket that is fitted in an inner circumferential part of an opening formed at an axial end of the molded stator to surround and support an outer ring of the bearings and that is formed of an insulating resin; and a bracket that is provided on a counter-load side of the insulating bracket and is fixed at least to the molded stator.

According to the present invention, the number of sites where positioning of the rotor in a radial direction is performed is reduced to suppress the axial misalignment between the centers of the stator and the rotor or the eccentricity of the rotor and thus increase in vibration and noise can be suppressed.

DETAILED DESCRIPTION

Exemplary embodiments of a molded motor and an air-conditioning outdoor unit according to the present invention will be explained below in detail with reference to the accompanying drawings. The present invention is not limited to the embodiments.

First Embodiment.

Figure 1:
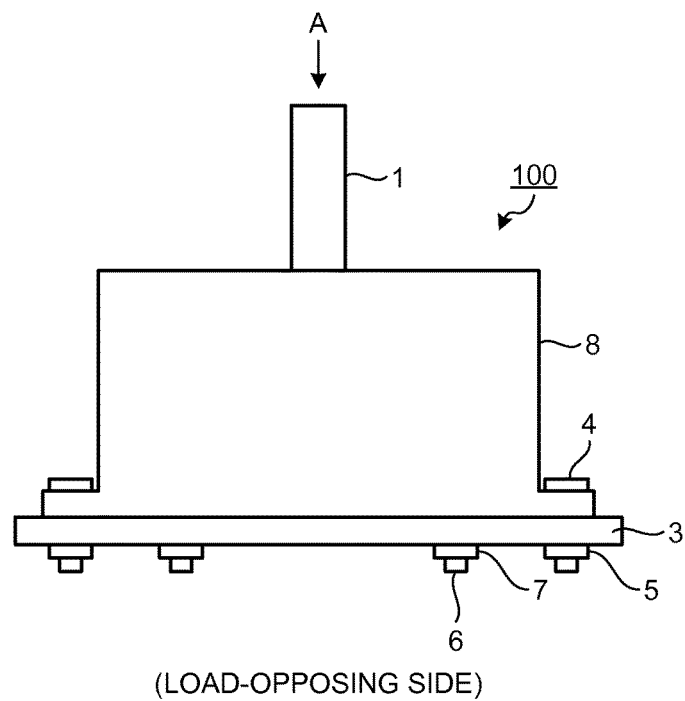
FIG. 1 is a side view of a molded motor according to a first embodiment of the present invention.
Figure 2:
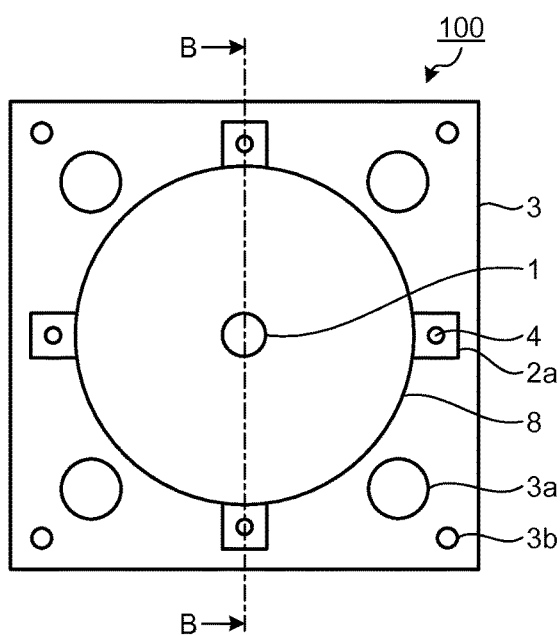
FIG. 2 is a front view of the molded motor viewed in a direction of an arrow A illustrated in FIG. 1.
Figure 3:
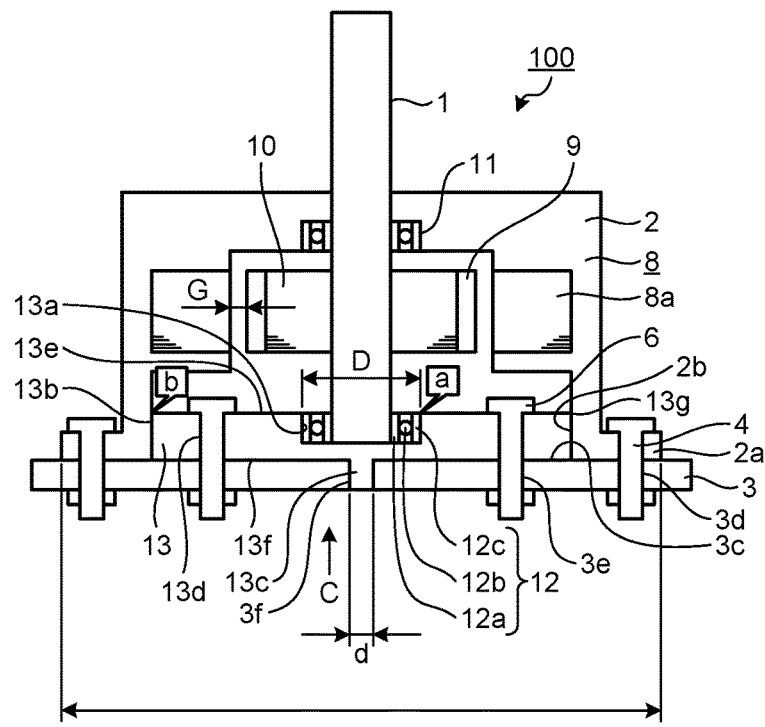
FIG. 3 is a section view taken in a direction of arrows B-B illustrated in FIG. 2 (a longitudinal section view of the molded motor illustrated in FIG. 1).
Figure 4:
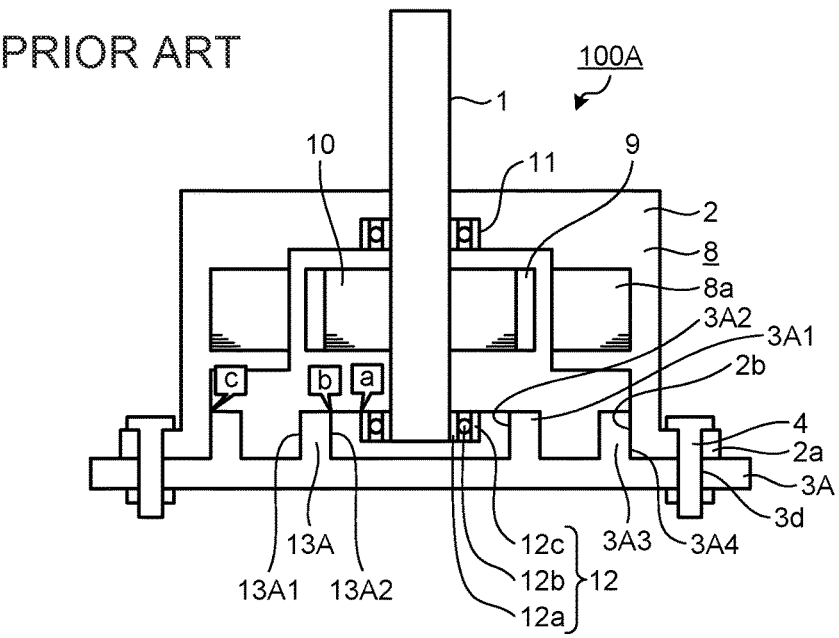
FIG. 4 is a longitudinal section view of a conventional molded motor.
Figure 5:
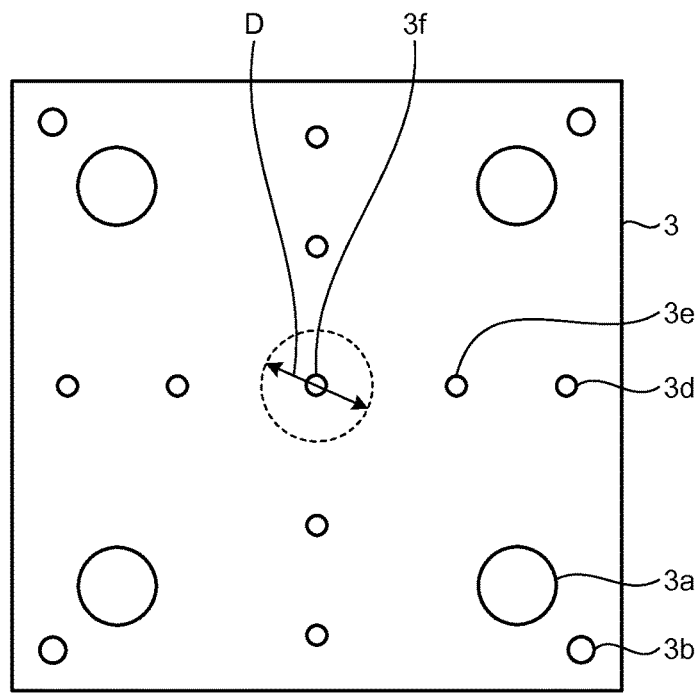
FIG. 5 is a front view of a bracket viewed in a direction of an arrow C illustrated in FIG. 3.
Figure 6:
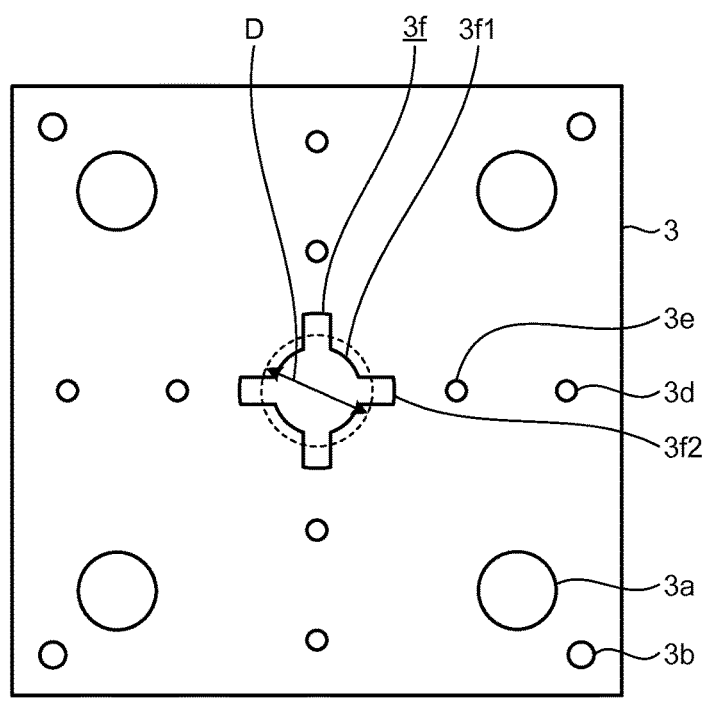
FIG. 6 is a front view of a bracket for explaining a first modification of the bracket.
Figure 7:
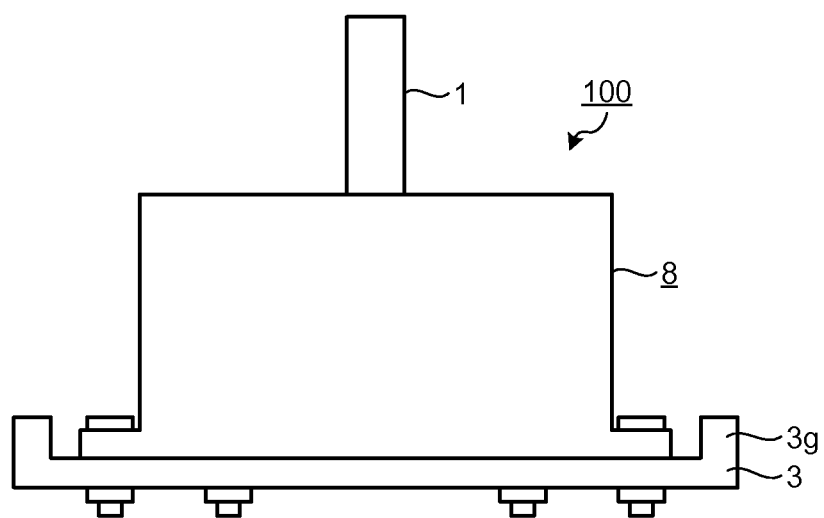
FIG. 7 is a side view of a molded motor for explaining a second modification of the bracket.
Figure 8:
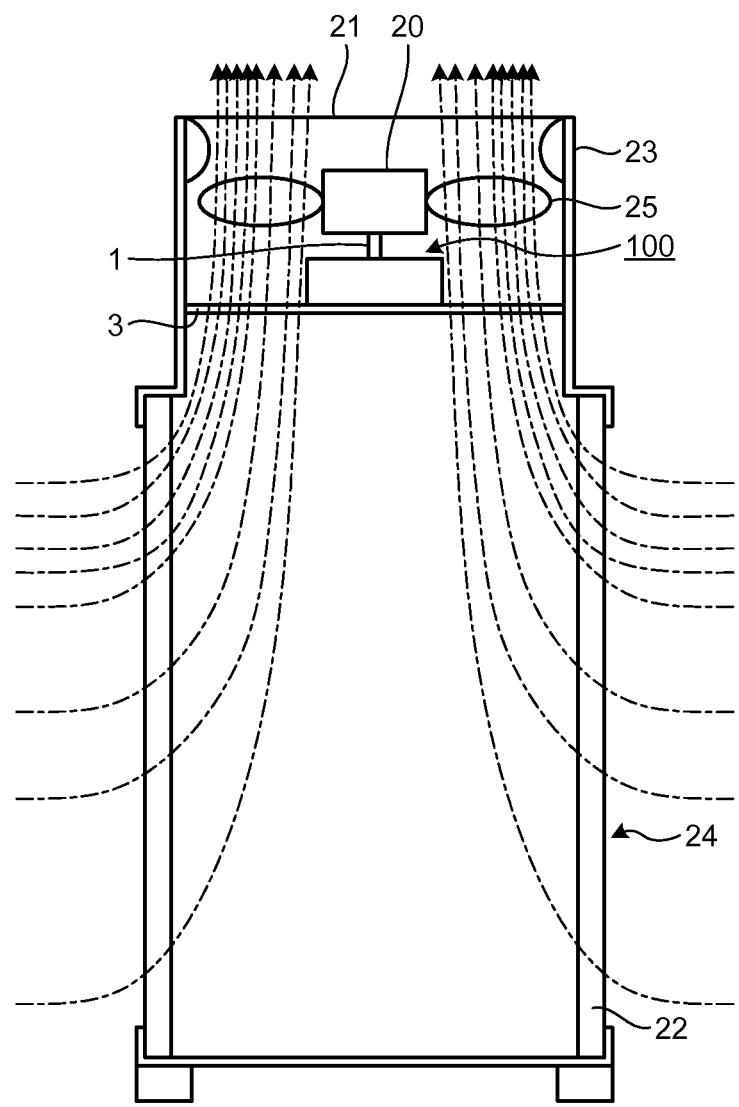
FIG. 8 is a side view of a top-flow air-conditioning outdoor unit having the molded motor illustrated in FIG. 1 mounted thereon.

FIG. 1 is a side view of a molded motor 100 according to a first embodiment of the present invention. FIG. 2 is a front view of the molded motor 100 viewed in a direction of an arrow A illustrated in FIG. 1. FIG. 3 is a section view taken in a direction of arrows B-B illustrated in FIG. 2 (a longitudinal section view of the molded motor 100 illustrated in FIG. 1). FIG. 4 is a longitudinal section view of a conventional molded motor 100A. FIG. 5 is a front view of a bracket 3 viewed in a direction of an arrow C illustrated in FIG. 3. FIG. 6 is a front view of a bracket 3 for explaining a first modification of the bracket. FIG. 7 is a side view of a molded motor 100 for explaining a second modification of the bracket 3. FIG. 8 is a side view of a top-flow air-conditioning outdoor unit having the molded motor 100 illustrated in FIG. 1 mounted thereon.

A molded motor 100 of the present embodiment mainly includes a molded stator 8 molded integrally with a stator core 8a using a thermosetting resin 2 such as a BMC (bulk molding compound), a rotor 10 having plural permanent magnets 9 which are placed to face an inner circumferential part of the stator core 8a, a rotor shaft 1 fixed at the axial center of the rotor 10, a pair of bearings 11 and 12 supporting the rotor shaft 1, an insulating bracket 13 supporting an outer ring of the bearing 12 and being fitted into the inner diameter side of the molded stator 8 from a side opposite to a load (hereinafter, "counter-load side") in the axial direction of the molded stator 8, and a bracket 3 facing a face on the counter-load side of the insulating bracket 13 and being fixed to an end of the molded stator 8 on the counter-load side.

The rotor shaft 1 is connected to the load. The rotor 10 obtains a rotary force from a rotation magnetic field of the stator core 8a and transmits the torque to the rotor shaft 1 to drive the load. In FIG. 1, a side of the molded motor 100 to which the load is connected is denoted as "load side" and the other side to which the load is not connected is denoted as "counter-load side".

A BMC with a high dimensional stability, for example, is used for the resin 2. At the counter-load side of the molded stator 8 in the axial direction, an opening (not illustrated) is formed.

The bracket 3 has plural installation holes 3b near corners (four corners) of the insulating bracket 13 to fix the molded motor 100 (see FIG. 2). The bracket 3 has plural air holes 3a. Positions, sizes, and the number of the air holes 3a, which are provided for improving the aerodynamic characteristics and the heat radiation performance, can be arbitrarily selected. The bracket 3 has insertion holes 3e for screws 6 used in fixing the insulating bracket 13 to the bracket 3 and insertion holes 3d for screws 4 used in fixing the bracket 3 to a plurality of leg parts 2a extending from the outer circumferential side of the resin 2 radially to the outside (see FIGS. 3 and 5).

The bracket 3 has a surface (a load-side face 3c) facing the insulating bracket 13 and the molded stator 8 formed in a planar shape. The bracket 3 is fixed with the screws 4 to be in contact with a load-opposing-side face 13f of the insulating bracket 13 and the leg part 2a of the resin 2. In the molded motor 100 according to the present embodiment, the insulating bracket 13 positions the rotor 10 in the radial direction and the bracket 3 does not need to perform the positioning in the radial direction. Accordingly, the bracket 3 does not need to have a concave-convex shape as in a bracket 3A described below (see FIG. 4). The bracket 3 can have the planar load-side face 3c, thus achieving reduction in the processing cost. Rib machining to prevent deflection involved with forming of the planar shape of the bracket 3 or hole machining to draw a wire connected to a winding of the stator core 8a to the outside of the molded stator 8 does not increase the processing cost because such machining does not greatly influence the accuracy of positioning of the rotor 10 in the radial direction.

The bracket 3 can be made of metal or an identical material to the insulating bracket 13. The bracket 3 made of metal can enhance the strength in the axial direction of the rotor shaft 1 rather than the bracket 3 made of a BMC. Particularly, in a case where the rotor shaft 1 has a fan 20 (see FIG. 8) attached thereto, a large force is applied in the axial direction of the rotor shaft 1 and thus the strength of the insulating bracket 13 in the axial direction along may be insufficient. The metallic bracket 3 fixed to the insulating bracket 13 can compensate the strength of the insulating bracket 13 in the axial direction of the rotor shaft 1.

When the bracket 3 is produced by pressing a metal sheet, the thickness of the metal sheet to be used is likely to increase and the dimensional tolerance increases in proportion to the thickness of the metal sheet. In order to increase the dimensional accuracy, an additional machining process as well as the pressing needs to be performed. When it is assumed that the metal sheet has a general pressing accuracy of 5%, for example, the metal sheet with a thickness t of 1 millimeter has a processing accuracy A of 0.05 millimeter. A larger amount of eccentricity of the rotor 10 is likely to cause louder noise. The amount of eccentricity is not allowed to be 5% or larger of a gap G between the rotor 10 and the stator core 8a in a radial direction. For this reason, the metal thickness t×5%<the gap G×5% (the metal thickness t<the gap G) needs to be established. That is, if the thickness of the metal sheet is equal to or larger than the gap G, the amount of eccentricity exceeds 5%. When the bracket 3 is produced of the metal sheet with a thickness equal to or larger than the gap G, the bracket 3 needs post-processing to increase the accuracy. Even if the thickness of the metal sheet to be used is large, the processing accuracy in the pressing can be increased in this way. However, the processing cost increases because enlarging equipment and increasing the maintenance frequency are incurred due to increase in the pressing force or increase in the wear loss of a mold.

In the molded motor 100 of the present embodiment, the insulating bracket 13 positions the rotor 10 in the radial direction and the bracket 3 does not need to perform the positioning in the radial direction. Accordingly, even when the bracket 3 is produced by using a metal sheet, the bracket 3 requires no post-processing to obtain the positioning accuracy in the radial direction, thus causing no increase in the production cost of the molded motor 100.

The bracket 3 made of iron can enhance the strength in the axial direction of the rotor shaft 1 rather than the bracket 3 made of aluminum having the same volume. Particularly, in a case where the rotor shaft 1 has the fan 20 attached thereto, a large force is applied in the axial direction of the rotor shaft 1. The bracket 3 made of iron, however, can enhance the strength in the axial direction of the rotor shaft 1.

The bracket 3 can be formed by aluminum die-casting (mold casting). Aluminum has a smaller specific gravity than iron and can be formed into a certain shape at a low cost. Post-processing needs to be performed because aluminum die-casting cannot provide a high accuracy. In the molded motor 100 according to the present embodiment, the insulating bracket 13 positions the rotor 10 in the radial direction and the bracket 3 does not need to perform the positioning in the radial direction. Accordingly, also when the bracket 3 is produced by aluminum die-casting, no post-processing to the bracket 3 to obtain the positioning accuracy in the radial direction is required, thus achieving reduction in the weight of the molded motor 100 without increasing the production cost.

The insulating bracket 13 has a concave part 13a protruding from the load side toward the counter-load side at the center of a face (a load-side face 13e) facing the rotor 10 (see FIG. 3).

The concave part 13a is formed to have an inner diameter substantially equal to the diameter of an outer ring 12c of the bearing 12. The outer ring 12c of the bearing 12 is thus held by the concave part 13a of the insulating bracket 13.

An outer circumferential part 13b of the insulating bracket 13 is formed to have a diameter substantially equal to the inner diameter of an inner circumferential part 2b at the opening of the molded stator 8. The insulating bracket 13 is thereby held by the molded stator 8. When being large, a dimensional tolerance of the outer circumferential part 13b of the insulating bracket 13 or a dimensional tolerance of the inner circumferential part of the concave part 13a has an influence on the accuracy of positioning of the rotor 10 in the radial direction. The insulating bracket 13 is thus formed preferably with a highly accurate dimension.

In the molded motor 100 according to the present embodiment, the bracket 3 is located on the counter-load-side face 13*f* of the insulating bracket 13, the screws 6 are inserted through the insertion holes 13*d* of the insulating bracket 13 and the insertion holes 3*e* of the bracket 3, and the screws 6 are fastened into nuts 7 (see FIG. 1), thereby fixing the bracket 3 to the insulating bracket 13. Particularly, in a case where the rotor shaft 1 has the fan 20 attached thereto, a large force is applied in the axial direction of the rotor shaft 1. The bracket 3 fixed to the insulating bracket 13 can enhance the strength in the axial direction of the rotor shaft 1.

In order to assemble the rotor 10, the insulating bracket 13, and the bracket 3 to the molded stator 8, the bearings 11 and 12 are first pressed and fitted to the load side of the rotor shaft 1, and the rotor 10 to which the bearings 11 and 12 have been pressed and fitted is inserted from the opening on the counter-load side of the molded stator 8 to the inside of the molded stator 8. Next, the screws 6 inserted into the insulating bracket 13 are exposed from the counter-load side face of the bracket 3, and the exposed screws 6 are fastened with nuts 7. Thereafter, the insulating bracket 13 is fitted into the inner circumferential part 2*b* of the molded stator 8. The screws 4 are inserted into the leg part 2*a* of the molded stator 8. The screws 4 exposed from the counter-load side face of the bracket 3 are fastened with the nuts 5. In this way, the molded motor 100 is completed.

In assembling the rotor 10 to the molded stator 8, the stator 10 inclines by being attracted to the stator core 8*a* because the rotor 10 includes the magnets. If the bearing 12 installed in the insulating bracket 13 is assembled with the rotor shaft 1 of the rotor 10 in this state, the center of the molded stator 8 is eccentric to the center of the insulating bracket 13. This causes a corner 13*g* between the load-side face 13*e* of the insulating bracket 13 and the outer circumferential part 13*b* of the insulating bracket 13 to interfere with the molded stator 8, so that the assembling efficiency is deteriorated. In the molded motor 100 according to the present embodiment, therefore, chamfering processing or rounding processing is performed to the corner 13*g*. The processing is performed in such a manner that the dimension of the chamfered or rounded part is larger than that of the above-mentioned gap G (see FIG. 3), for example. In this way, the assembling efficiency can be improved. Performing similar processing to a corner of the inner circumferential part 2*b* of the molded stator 8 or to both the corner 13*g* with the outer circumferential part 13*b* of the insulating bracket 13 and the corner of the inner circumferential part 2*b* of the molded stator 8 also demonstrates identical effects.

The bracket 3 according to the present embodiment preferably has an axial thickness larger than the gap G. The amount of eccentricity is not allowed to be 5% or larger of the gap G as described above, and thus the bracket 3 preferably ensures a thickness equal to or larger than the gap G. In such a case, however, to increase the dimensional accuracy of the bracket 3, post-processing needs to be performed. In the molded motor 100 according to the present embodiment, the insulating bracket 13 positions the rotor 10 in the radial direction and the bracket 3 does not need to perform the positioning in the radial direction. Accordingly, even when the bracket 3 is configured to have a thickness larger than the gap G, no post-processing is required to increase the dimensional accuracy in the radial direction, thus causing no increase in the processing cost.

On the counter-load side face 13*f* of the insulating bracket 13, a protrusion 13*c* protruding toward the counter-load side (the side of the bracket 3) is formed as illustrated in FIG. 3. The bracket 3 has a recess 3*f* formed at a position corresponding to the protrusion 13*c*. The protrusion 13*c* fitted into the recess 3*f* prevents the positional displacement of the bracket 3 in the radial direction and improves the assembling efficiency in assembling the bracket 3 to the insulating bracket 13. The protrusion 13*c* and the recess 3*f* are provided for ensuring the assembling efficiency. It is not necessary to improve the processing accuracy of the recess 3*f* of the bracket 3 and thus no increase in the processing cost is caused. The recess 3*f* in the example illustrated in the drawings is formed in a hole-like shape penetrating through the bracket 3 in the axial direction. However, the shape of the recess 3*f* is not limited to the illustrated one and can be formed in a concave shape without penetrating.

The recess 3*f* can be formed as follows. Because a force applied from the rotor shaft 1 in the axial direction is transmitted from the outer ring 12*c* of the bearing 12 to the insulating bracket 13, the insulating bracket 13 needs to have a certain level of strength. Accordingly, the recess 3*f* is formed to have a diameter d smaller than an outer diameter D of the outer ring 12*c* of the bearing 12 as illustrated in FIGS. 3 and 5, so that the bracket 3 can receive the force applied from the outer ring 12*c* to the side of the insulating bracket 13. In this way, the strength of the insulating bracket 13 in the axial direction of the rotor shaft 1 can be compensated.

Next, the principle of generation of electric corrosion and a structure for suppressing electric corrosion are described. In a case where the molded motor 100 is driven by an inverter, unbalance occurring at power sources to be applied or at respective windings of phases provided to the stator induces a voltage, for example, across axial ends of the rotor shaft 1 associated with switching of the inverter. When this voltage exceeds a dielectric breakdown voltage of oil films inside the bearings, a minute shaft current (a discharge current) flows inside the bearings 11 and 12. This shaft current causes electric corrosion inside the bearings 11 and 12. When the electric corrosion progresses, a wavelike abrasion phenomenon occurs in an inner ring 12*a*, the outer ring 12*c*, or a rolling element 12*b*. An abnormal sound caused by the abrasion phenomenon is one of main causes of faults in the motor. In order to suppress occurrence of such electric corrosion, it is effective to place an insulating material on a shaft-current path to reduce the shaft current. In a molded motor 100 according to the present embodiment, the outer ring 12*c* of the bearing 12 placed at the counter-load side of the rotor shaft 1 is held by the insulating bracket 13 to reduce a current.

In a conventional molded motor 100A illustrated in FIG. 4, a bracket 3A made of metal is used. The bracket 3A has a circular ring part 3A1 formed at a center of a face facing the rotor 10 and a circular ring part 3A3 formed at an outer circumference side of the face facing the rotor 10. An inner circumferential part 3A2 of the ring part 3A1 has an insulating bracket 13A. The inner diameter of the ring part 3A1 is substantially equal to the diameter of the insulating bracket 13A. An outer circumferential part 3A4 of the ring part 3A3 has a diameter substantially equal to the inner diameter of the inner circumferential part 2*b* near the opening of the molded stator 8. The outer ring 12*c* of the bearing 12 is held by the inner circumferential part 13A2 of the insulating bracket 13A. The insulating bracket 13A is fitted into the ring part 3A1 of the bracket 3A. In this way, an insulating material is interposed on a shaft-current path and thus the shaft current is reduced.

However, the conventional molded motor 100A has three sites where positioning of the rotor 10 in the radial direction is performed. That is, the positioning sites in the molded motor 100A include a part where an inner circumferential part 13A2 of the insulating bracket 13A covering the outer ring 12c contacts with the outer ring 12c (a positioning site a), a part where an outer circumferential part 13A1 of the insulating bracket 13A contacts with the inner circumferential part 3A2 of the ring part 3A1 (a positioning site b), and a part where the inner circumferential part 2b of the resin 2 contacts with the outer circumferential part 3A4 of the ring part 3A3 (a positioning site c). A larger number of the positioning sites of the rotor 10 causes a larger axial misalignment between the centers of the stator core 8a and the rotor 10 or a larger eccentricity of the rotor 10 because a variation occurs due to a combination of tolerances in the positioning sites. Consequently, an unbalanced magnetic attraction force, for example, increases vibration and noise.

The molded motor 100 according to the present embodiment includes a smaller number of sites where positioning of the rotor in the radial direction is performed than the conventional molded motor 100A. More specifically, the positioning sites in the molded motor 100 include a part where the inner diameter part of the concave part 13a contacts with the outer ring 12c (a positioning site a) and a part where the outer circumferential part 13b of the insulating bracket 13 contacts with the inner circumferential part 2b of the molded stator 8 (a positioning site b), as illustrated in FIG. 3. That is, the number of the positioning sites is smaller by one than that in the conventional molded motor 100A. The smaller number of the positioning sites provides a smaller axial misalignment between the centers of the stator core 8a and the rotor 10 or a smaller eccentricity of the rotor 10. Vibration and noise can be thus reduced.

In order to suppress the influence of electric corrosion, reduction in the shaft current flowing through the bearings 11 and 12 is required. In order to reduce the shaft current, it is effective to place the outer ring 12c as remote as possible from a metal part (the bracket 3). The recess 3f of the bracket 3 illustrated in FIG. 6 is formed in such a manner that parts 3f1 of the outer frame of the recess are located at an inner diameter side of an area in a radial direction (an area indicated by a dotted line) which is formed by projecting the outer diameter D of the outer ring 12c on the bracket 3 and remaining parts 3f2 of the outer frame of the recess are located at an outer diameter side of the area. This configuration can provide strength against the force applied from the outer ring 12c to the side of the insulating bracket 13 and further reduce the shaft current.

When a reaction force applied to the shaft is small due to a small output or when the weight of the motor is small, the outer diameter of the recess 3f can be larger than that in FIG. 6. That is, the outer frame of the recess 3f can be formed to be located at the outer diameter side of the area indicated by the dotted line in FIG. 6. This configuration includes less metal located in the axial direction of the bearing 12 than the configuration in FIG. 6. Accordingly, the shaft current can be further reduced.

In order to improve the strength of the bracket 3, it is effective to bend a part of the bracket 3 as illustrated in FIG. 7 or to provide a rib (not illustrated) to the bracket 3. The bracket 3 illustrated in FIG. 7 has two parts outside a position facing the molded stator 8 bent in the axial direction (toward the load side in FIG. 7). The parts or bent parts 3g can enhance the strength of the bracket 3 in the axial direction of the rotor shaft 1. Increase in processing accuracy of the bent parts 3g is not required, thus causing no increase in the processing cost.

In the present embodiment, the example in which the bracket 3 is fixed with the screws 4 is described. The bracket 3 can be fixed to the molded stator 8 with an adhesive or a swage instead of the screws 4. However, the bracket 3 is fixed preferably with the screws 4 because fastening can be managed as well as the assembling efficiency is improved when the screws 4 are used.

In the present embodiment, the bracket 3 is fixed to the insulating bracket 13 with the screws 6. However, other fixing manners can be applied. When the material of the bracket 3 is the same as that of the insulating bracket 13 and the bracket 3 is formed integrally with the insulating bracket 13, the screws 6 are not required. In another example, even if the material of the bracket 3 differs from that of the insulating bracket 13 and when the bracket 3 is formed integrally with the insulating bracket 13, the screws 6 are not required. In the molded motor 100 of the present embodiment, the bracket 3 is placed on the counter-load side face 13f of the insulating bracket 13 as an example. However, when the reaction force applied to the rotor shaft 1 is small or the weight of the motor is small, for example, the bracket 3 can be eliminated because positioning in the axial direction of the rotor shaft 1 can be performed by the insulating bracket 13 being pressed and fitted in the molded stator 8. Also in such a case, the molded motor 100 can be fixed to an outdoor unit or the like, for example, by using the leg parts 2a of the molded stator 8.

The outer circumferential part 13b of the insulating bracket 13 can have a protrusion (not illustrated) protruding toward the side of the inner circumferential part 2b of the molded stator 8 and the inner circumferential part 2b of the molded stator 8 can have a recess at a position corresponding to the protrusion. The protrusion fitted into the recess prevents positional displacement of the insulating bracket 13 in the circumferential direction. For example, the position of a hole for drawing the wire connected to the winding of the stator core 8a to the outside of the molded stator 8 is determined. The assembling efficiency can be thus improved.

The insulating bracket 13 is formed preferably with a highly accurate dimension because the insulating bracket 13 has an influence on the accuracy of positioning the rotor 10 in the radial direction. Accordingly, a BMC which has a low shrinkage and a low linear expansion coefficient in molding is preferable as the material of the insulating bracket 13. The BMC improves the dimensional stability and thus the BMC can form the insulating bracket 13 with higher accuracy than other resins.

FIG. 8 illustrates an embodiment of a top-flow air-conditioning outdoor unit using the molded motor 100 of the present embodiment. The top-flow air-conditioning outdoor unit includes a heat exchanger 22 provided on the side face of a housing 23, an air inlet 24 provided on the side face of the housing 23 to cause air to flow through the heat exchanger 22, an air outlet 21 from which air having flowed through the heat exchanger 22 is discharged to an upper face of the outdoor unit, the fan 20 taking air on the side face of the outdoor unit into the unit and discharging the air from the air outlet 21 to the outside of the unit, and the molded motor 100 as a fan motor interposed between the heat exchanger 22 and the fan 20 to rotate the fan 20. The installation holes 3b (see FIG. 2) formed on the bracket 3 are fixed to the housing 23 to install the molded motor 100 to the top-flow air-conditioning outdoor unit. In the top-flow air-conditioning outdoor unit configured in this way, an operation of a compressor (not illustrated) in the outdoor unit causes circulation of a refrigerant to the heat exchanger 22, heat exchange between air around the heat exchanger 22 and the refrigerant, and rotation of the fan 20 to take air from the air inlet 24 to the inside of the outdoor unit. The wind generated at that time flows through the heat exchanger 22 to promote heat exchange.

The top-flow air-conditioning outdoor unit has a configuration in which the air outlet 21 is located on the upper face and the rotor shaft 1 of the molded motor 100 is directed toward the upper face. Therefore, the weight of the rotor 10 or the reaction force of blades 25 is transmitted to the bearings 11 and 12 at the lower part of the rotor shaft 1 via the rotor shaft 1. Thus, the oil films in the bearings 11 and 12 become thinner to facilitate a flow of the shaft current. The insulating bracket 13 and the bracket 3 (see FIG. 3) need to have the strength in the axial direction. In the top-flow air-conditioning outdoor unit, components other than the motor causes less noise, particularly because the load to the fan motor is the blades 25. Accordingly, reduction in noise in the motor is required.

When the molded motor 100 of the present embodiment is used as a fan motor of a top-flow air-conditioning outdoor unit, the bracket 3 can provide the strength in the axial direction of the rotor shaft 1 and suppressed eccentricity of the rotor 10 can reduce noise. Therefore, the molded motor 100 has a structure suitable for top-flow air-conditioning outdoor units.

The configurations of the bracket 3 and the insulating bracket 13 described in the present embodiment can be applied to the side of the bearing 11 and identical effects to various effects as described above can be demonstrated also in this case.

As described above, the molded motor 100 of the present embodiment includes the molded stator 8 formed by providing a molding resin to the stator 8a, the rotor 10 inside the molded stator 8, the pair of bearings 11 and 12 supporting the rotor shaft 1 of the rotor 10, and the insulating bracket 13 fitted in the inner circumferential part 2b of the opening formed at an axial end of the molded stator 8 to surround and support the outer ring 12c of the bearing 12 and formed of an insulating resin. In this configuration, the number of sites where positioning of the rotor in the radial direction is performed is smaller than in the conventional molded motor 100A. The smaller number of the positioning sites can reduce the axial misalignment between the centers of the stator core 8a and the rotor 10 or the eccentricity of the rotor 10. Vibration and noise can be thereby suppressed.

The molded motor and the air-conditioning outdoor unit described in the present embodiment are for providing an example of the present invention and can be, of course, further combined with a different known technique or subjected to a modification such as omission of a part without departing from the scope of the present invention.

INDUSTRIAL APPLICABILITY

As described above, the present invention is applicable to a molded motor and an air-conditioning outdoor unit and is particularly useful as an invention that provides reduction in vibration and noise.

The invention claimed is:

1. A molded motor comprising:
    a molded stator that is formed by providing a molding resin to a stator;
    a rotor provided inside the molded stator;
    a pair of bearings that support a rotor shaft of the rotor;
    an insulating bracket that is fitted in an inner circumferential part of an opening formed in an end of the molded stator in an axial direction, which supports one of the bearings by surrounding an outer ring of the one of the bearings, and that is formed of an insulating resin; and
    a bracket that is provided on a counter-load side of the insulating bracket and is fixed at least to the molded stator.

2. The molded motor according to claim 1, wherein the bracket is made of metal.

3. The molded motor according to claim 1, wherein the bracket is formed by aluminum die casting.

4. The molded motor according to claim 1, wherein the bracket is made of iron.

5. The molded motor according to claim 1, wherein the bracket has an axial thickness larger than the gap between the rotor and the stator in a radial direction.

6. The molded motor according to claim 1, wherein the bracket is formed such that a face facing the insulating bracket and the molded stator has a planar shape.

7. The molded motor according to claim 1, wherein
    the insulating bracket has a projection on the counter-load side, the projection projecting toward the counter-load side, and
    the bracket has a recess at a position corresponding to the projection.

8. The molded motor according to claim 7, wherein the recess has a diameter smaller than an outer diameter of the bearings.

9. The molded motor according to claim 7, wherein the recess is formed in such a way that a part of an outer frame of the recess is located inside an area in a radial direction and a remaining part of the outer frame is located outside the area in a radial direction, the area being formed by projecting an outer diameter of the outer ring of the bearings on the bracket.

10. The molded motor according to claim 1, wherein the bracket has a part that is bent in the axial direction, the part being located on an outer side of a position, at which the bracket faces the mold stator, in a radial direction.

11. The molded motor according to claim 1, wherein a material of the insulating bracket is a BMC (bulk molding compound).

12. An air-conditioning outdoor unit using the molded motor according to claim 1 is used as a fan motor of the top-flow air-conditioning outdoor unit including an air inlet on a side face and an air outlet on an upper face.

13. The molded motor according to claim 1, wherein the bracket is formed into a planar shape.

* * * * *